US006987076B1

(12) United States Patent
Jubb et al.

(10) Patent No.: US 6,987,076 B1
(45) Date of Patent: Jan. 17, 2006

(54) BONDED FIBROUS MATERIALS

(75) Inventors: Gary Anthony Jubb, Stourport-on-Severn (GB); Jean-Louis Martin, Montbrisson (FR); Jane Miller, Ellesmere Port (GB); Arlette Wotovic, Wissembourg (FR); Lindsay John Harold Todd, Merseyside (GB)

(73) Assignee: The Morgan Crucible Company plc, Windsor (GB)

( * ) Notice: Subject to any disclaimer, the term of this patent is extended or adjusted under 35 U.S.C. 154(b) by 0 days.

(21) Appl. No.: 09/762,870

(22) PCT Filed: Sep. 14, 1999

(86) PCT No.: PCT/GB99/03085

§ 371 (c)(1),
(2), (4) Date: Mar. 22, 2001

(87) PCT Pub. No.: WO00/15574

PCT Pub. Date: Mar. 23, 2000

(30) Foreign Application Priority Data

Sep. 15, 1998 (GB) .................................... 9820124

(51) Int. Cl.
 C03C 13/06 (2006.01)
(52) U.S. Cl. ........................ 501/35; 501/36; 501/95.1; 501/95.2
(58) Field of Classification Search ................... 501/35, 501/36, 95.1, 95.2
See application file for complete search history.

(56) References Cited

U.S. PATENT DOCUMENTS

| | | | |
|---|---|---|---|
| 2,051,279 A | 8/1936 | Thorndyke | |
| 2,116,303 A | 5/1938 | Coss | |
| 2,155,107 A | 4/1939 | Tyler et al. | |
| 2,308,857 A | 1/1943 | Bowes | |
| 2,428,810 A | 10/1947 | Powell | |
| 2,520,168 A | 8/1950 | Powell | |
| 2,520,169 A | 8/1950 | Powell | |
| 2,576,312 A | 11/1951 | Minnick | |
| 2,577,431 A | 12/1951 | Powell | |
| 2,823,416 A | 2/1958 | Powell | |
| 3,348,956 A | 10/1967 | Ekdahl | |
| 3,449,137 A | 6/1969 | Ekdahl | |
| 3,799,836 A | 3/1974 | Rogers et al. | |
| 3,835,054 A | 9/1974 | Olewinski et al. | |
| 3,887,386 A | 6/1975 | Majumdar | |
| 3,969,121 A | 7/1976 | Atkinson | |
| 4,014,704 A * | 3/1977 | Miller ...................... 106/38.22 | |
| 4,036,654 A | 7/1977 | Yale et al. | |
| 4,041,199 A * | 8/1977 | Cartwright ................... 428/36 | |
| 4,047,965 A | 9/1977 | Karst et al. | |
| 4,054,472 A | 10/1977 | Kondo et al. | |
| 4,055,434 A | 10/1977 | Chen et al. | |
| 4,153,439 A | 5/1979 | Tomic et al. | |
| 4,205,992 A | 6/1980 | Mogensen et al. | |
| 4,238,213 A | 12/1980 | Pallo et al. | |
| 4,251,279 A | 2/1981 | Ekdahl | |
| 4,274,881 A | 6/1981 | Langton et al. | |
| 4,325,724 A | 4/1982 | Froberg | |
| 4,342,581 A | 8/1982 | Neubauer et al. | |
| 4,351,054 A | 9/1982 | Olds | |
| 4,366,251 A | 12/1982 | Rapp | |
| 4,377,415 A | 3/1983 | Johnson et al. | |
| 4,430,369 A | 2/1984 | Payne | |
| 4,437,192 A | 3/1984 | Fujiu et al. | |
| 4,443,550 A | 4/1984 | Kume et al. | |
| 4,482,541 A | 11/1984 | Telfer et al. | |
| 4,555,492 A | 11/1985 | Ekdahl et al. | |
| 4,615,988 A | 10/1986 | Le Moigne et al. | |
| 4,661,134 A | 4/1987 | Hartung | |
| 4,678,659 A | 7/1987 | Drake et al. | |
| 4,693,740 A | 9/1987 | Noiret et al. | |
| 4,857,489 A * | 8/1989 | Bearden ....................... 501/36 | |
| 4,873,209 A * | 10/1989 | Gnyra ......................... 501/125 | |
| 4,957,559 A | 9/1990 | Tiesler et al. | |
| 5,032,552 A | 7/1991 | Nonami et al. | |
| 5,055,428 A | 10/1991 | Porter | |
| 5,108,957 A | 4/1992 | Cohen et al. | |
| 5,121,748 A | 6/1992 | Ditz et al. | |
| 5,135,893 A | 8/1992 | Dohi et al. | |
| 5,217,529 A | 6/1993 | Tiesler et al. | |
| 5,248,637 A | 9/1993 | Taneda et al. | |
| 5,250,488 A | 10/1993 | Thelohan et al. | |
| 5,290,350 A * | 3/1994 | Besnard et al. ............... 252/62 | |
| 5,312,806 A | 5/1994 | Mogensen | |
| 5,332,699 A | 7/1994 | Olds et al. | |
| 5,346,868 A | 9/1994 | Eschner | |
| 5,401,693 A | 3/1995 | Bauer et al. | |
| 5,407,872 A | 4/1995 | Komori et al. | |
| 5,552,213 A | 9/1996 | Eschner | |

(Continued)

FOREIGN PATENT DOCUMENTS

AU 255803 7/1963

(Continued)

OTHER PUBLICATIONS

Search Report performed by UK Patent Office in priority Application No. 9820124.7.

(Continued)

*Primary Examiner*—Paul Marcantoni
(74) *Attorney, Agent, or Firm*—Smith, Gambrell & Russell, LLP

(57) ABSTRACT

A composite material comprises inorganic-bonded alkaline earth silicate fibers in which any bonding agents or fillers comprise low amounts of aluminum so that the composite material comprises less than 1% by weight aluminum expressed as $Al_2$—$O_3$.

26 Claims, No Drawings

U.S. PATENT DOCUMENTS

| | | | |
|---|---|---|---|
| 5,583,080 | A | 12/1996 | Guldberg et al. |
| 5,614,449 | A | 3/1997 | Jensen |
| RE35,557 | E | 7/1997 | Thelohan et al. |
| 5,691,255 | A | 11/1997 | Jensen et al. |
| 5,714,421 | A | 2/1998 | Olds et al. |
| 5,811,360 | A | 9/1998 | Jubb |
| 5,821,183 | A | 10/1998 | Jubb |
| 5,843,854 | A | 12/1998 | Karppinen et al. |
| 5,880,046 | A * | 3/1999 | Delvaux et al. ............ 501/123 |
| 5,912,201 | A * | 6/1999 | Couture et al. ............ 501/95.1 |
| 5,928,975 | A | 7/1999 | Jubb |
| 5,955,389 | A | 9/1999 | Jubb |
| 5,994,247 | A | 11/1999 | Jubb et al. |
| 5,997,247 | A | 12/1999 | Arraitz et al. |
| 6,037,284 | A | 3/2000 | Holstein et al. |
| 6,043,172 | A * | 3/2000 | Hart ......................... 501/95.1 |
| 6,043,173 | A * | 3/2000 | Hart ......................... 501/95.2 |
| 6,060,414 | A | 5/2000 | Holstein et al. |
| 6,180,546 | B1 * | 1/2001 | Jubb et al. ..................... 501/26 |
| 6,214,102 | B1 * | 4/2001 | Vandermeer ............... 501/95.2 |
| 6,287,994 | B1 * | 9/2001 | Hart ............................ 501/12 |

FOREIGN PATENT DOCUMENTS

| | | |
|---|---|---|
| CA | 2017344 | 11/1990 |
| DE | 1 94 2 991 | 3/1970 |
| DE | 27 48 127 | 5/1978 |
| DE | 2732 387 | 11/1978 |
| DE | 34 44 397 A1 | 6/1986 |
| DE | 39 05 394 C2 | 9/1989 |
| DE | 44 17 230 A1 | 11/1995 |
| DE | 44 17 231 A1 | 11/1995 |
| DE | 44 21 120 A1 | 12/1995 |
| DE | 44 47 576 A1 | 5/1996 |
| DE | 44 47 577 A1 | 5/1996 |
| EP | 0 019 600 A3 | 11/1980 |
| EP | 0 076 677 A1 | 4/1983 |
| EP | 0 135 449 A1 | 3/1985 |
| EP | 0 144 349 B1 | 6/1985 |
| EP | 0 399 320 A1 | 11/1990 |
| EP | 0 399 652 A1 | 11/1990 |
| EP | 0 412 878 A1 | 2/1991 |
| EP | 0 459 897 A1 | 12/1991 |
| EP | 0 546 984 A1 | 6/1993 |
| EP | 0 091 866 A1 | 10/1993 |
| EP | 0 585 547 A1 | 3/1994 |
| EP | 0 588 251 A1 | 3/1994 |
| EP | 0 591 696 A1 | 4/1994 |
| EP | 0 586 797 A1 | 6/1994 |
| EP | 0 685 434 B1 | 12/1995 |
| EP | 0 710 628 A2 | 5/1996 |
| EP | 0 936 199 A2 | 8/1999 |
| EP | 0 115 673 B1 | 7/2001 |
| FI | 63007 | 12/1982 |
| FR | 1 149 289 | 12/1957 |
| FR | 1 165 275 | 10/1958 |
| FR | 1 589 410 | 3/1970 |
| FR | 2 118 026 | 7/1972 |
| FR | 2 662 687 | 12/1991 |
| FR | 2 662 688 | 12/1991 |
| GB | 520247 | 4/1940 |
| GB | 790397 | 2/1958 |
| GB | 810773 | 3/1959 |
| GB | 1 045 848 | 10/1966 |
| GB | 1 204 472 | 9/1970 |
| GB | 1 209 244 | 10/1970 |
| GB | 1 273 205 | 5/1972 |
| GB | 1 399 556 | 7/1975 |
| GB | 1 446 910 | 8/1976 |
| GB | 1 462 173 | 1/1977 |
| GB | 1 473 908 | 5/1977 |
| GB | 1 532 612 | 11/1978 |
| GB | 2 011 379 B | 7/1979 |
| GB | 2 081 703 A | 2/1982 |
| GB | 2 083 017 A | 3/1982 |
| GB | 2 122 537 A | 1/1984 |
| GB | 2 150 553 A | 7/1985 |
| GB | 2 164 557 A | 3/1986 |
| GB | 2 259 700 A | 3/1993 |
| JP | 49-27620 | 3/1974 |
| JP | 51-13819 | 2/1976 |
| JP | 51-43429 A | 4/1976 |
| JP | 51-133311 | 11/1976 |
| JP | 52-4519 | 1/1977 |
| JP | 52-139113 | 11/1977 |
| JP | 56-54252 | 5/1981 |
| SE | 104380 | 4/1942 |
| SU | 276349 | 7/1970 |
| SU | 259337 | 8/1970 |
| SU | 607807 | 5/1978 |
| WO | WO 85/02394 | 6/1985 |
| WO | WO 86/04807 | 8/1986 |
| WO | WO 87/05007 | 8/1987 |
| WO | WO 89/05007 | 8/1987 |
| WO | WO 90/02713 | 3/1990 |
| WO | WO 90/11756 | 10/1990 |
| WO | WO 91/11403 | 8/1991 |
| WO | WO 92/07801 | 5/1992 |
| WO | WO 93/09536 | 6/1992 |
| WO | WO 93/15028 | 8/1993 |
| WO | WO 93/15208 | 8/1993 |
| WO | WO 93/19596 | 10/1993 |
| WO | WO 93/22251 | 11/1993 |
| WO | WO 94/14717 | 7/1994 |
| WO | WO 94/14718 | 7/1994 |
| WO | WO 94/15883 | 7/1994 |
| WO | WO 94/23801 | 10/1994 |
| WO | WO 95/21799 | 8/1995 |
| WO | WO 95/29135 | 11/1995 |
| WO | WO 95/31410 | 11/1995 |
| WO | WO 95/31411 | 11/1995 |
| WO | WO 95/32925 | 12/1995 |
| WO | WO 95/32926 | 12/1995 |
| WO | WO 95/32927 | 12/1995 |
| WO | WO 95/35265 | 12/1995 |
| WO | WO 96/01793 | 1/1996 |
| WO | WO 96/02478 | 2/1996 |
| WO | WO 96/04213 | 2/1996 |
| WO | WO 04214 | 2/1996 |
| WO | WO 96/14274 | 5/1996 |
| WO | WO 96/16913 | 6/1996 |
| WO | WO 96/30314 | 10/1996 |
| WO | WO 97/16386 | 5/1997 |
| WO | WO 97/20782 | 6/1997 |
| WO | WO 97/21636 | 6/1997 |
| WO | WO 97/29057 | 8/1997 |
| WO | WO 97/30002 | 8/1997 |
| WO | WO 97/49643 | 12/1997 |
| WO | WO 98/02394 | 1/1998 |

OTHER PUBLICATIONS

WPI Abstract No. 93-285586 and JP5202352.
WPI Abstract No. 87-154127 and JP62091545.
WPI Abstract No. 81-2626D and JP56016578.
Brochure showing Manville Corporation entitled "Insulating Fiber Products" for New Superwool™ Product (two pages, undated), no date available.
Thermal Ceramics Product Information Brochure entitled Superwool Blanket (Grade X-607), 2 pages (undated, no date available.
Brochure by Carborundum Company entitled Insulfrax^R Specialty Glass Fiber Product Specification, 8 pages (Mar. 1993).

Brochure by Paraisten Kalkki Oy entitled Hohe Temperaturen? Großer Wärmeverlust? PARGAS-Platten 1000°C, 3 pages (undated), no date available.

"Fiber Glass," J. Mohr and W. Rowe, Table of Contents and pp. 4-27 (Van Nostrand Reinhold Company) (undated), no date available.

"Prediction of Glass Durability as a Function of Glass Composition and Test Conditions:Thermodynamics and Kinetics," C.M. Jantez, *Advances in the Fusion of Glass* pp. 24.1-24.17 (undated), no date available.

"Stability of Radioactive Waste Glasses Assessed from Hydration Thermodynamics," M.J. Plodinec, C.M. Jantez, and G.G. Wicks, pp. 755-758 (undated), no date available.

"Nuclear Waste Glass Durability: I, Predicting Environmental Response from Thermodynamic (Pourbaix) Diagrams," Carol M. Jantzen, *Journal of American Cermaic Society*, 75(9):2433-2448 (1992).

"Calcium Aluminate Glass Fibers: Drawing from Supercolled Melts Versus Inviscid Melt Spinning," F.T. Wallenberger et al., *Materials Letters,*, 11:229-235 (1991).

"Chemical Durability of Glass," *Chemistry of Glasses*, Chpater 6, 2nd Edition, A. Paul, pp. 179-218 (Chapman and Hall) (1990).

*Chemical Abstracts*, 110(10):373, Abstract No. 81274g (equivalent to CN-A-87 108257) (1989).

"Low-Cost Reinforcing Fibers Promise a High Level of Performance," S.A. Dunn, *Modern Plastics International*, pp. 50-51 (Jun. 1989).

"The Behaviour of Mineral Fibers in Physiological Solutions," H. Förster, *Proceedings of 1982 WHO IARC Conference*, Copenhagen, vol. 2, pp. 27-55 (1988).

"Chemical Durability," *Glass Science and Technology*, Chapter 34, pp. 377-388 (Elsevier) (1988).

"Glass-Water Interactions," H. Scholze, *Journal of Non-Crystalline Solids*, 102:1-10 (1988).

"The Reactions of MMMF in a Physiological Model Fluid and in Water," R. Klingholz & B. Steinkopf, 6i Proceedings of 1982 WHO IARC Conference, Copenhagen, vol. 2, pp. 61-86 (1988).

"Solubility and Durability of Manmade Mineral Fibers in Physiologival Fluids," J. Bauer, et al., (ninteen pages; dated no later than 1988).

Standard Test Methods for Fire Tests of Building Construction and Materials, ASTM Designation: E119-88, pp. 1-21 (1988).

"An In Vito Study of the Chemical Durability of Siliceous Fibres," H. Scholze & R. Conradt, *Annals of Occupational Hygiene*, 31:48, pp. 683-692 (1987).

"In vitro Study on Siliceous Fibres," H. Scholze & R. Conradt, *Proceedings of 1986 WHO IARC* Conference, 25 pages (1986).

"Chemical Durability of Asbestos and of Man-made Mineral Fibres in vivo," B. Bellman et al., *Aerosol Scientist*, vol. 17(3):341-345 (1986).

"Prediction of Nuclear Waste Glass Durability from Natural Analogs," C.M. Jantzen, *Advances in Ceramics*, vol. 20, 10 pages, Nuclear WAste Management II (1986).

"Thermodynamic Model of Natural, Medieval and Nuclear Waste Glass Durability," C.M. jantzen et al., *Journal of Non-Crystalline Solids*, 67:207-233 (1984).

"A New Approach to Predicting the Durability of Glasses from Their Chemical Compositions," R.G. Newton and A. Paul, *Glass Technology*, 21(6):307-309 (Dec. 1980).

"Inviscid Spinning of Filaments via Chemical Jet Stabilization," R.E. Cunningham, L.F. Rakestraw and s.A. Dunn, *The American Institute of Chemical Engineers Symposium Series*, No. 180, vol. 74:20-31 (1978).

"Chemical Durability of Glasses in the Systems $SiO_2$-CaO-$Na_2O$-$R_mO_n$" Ohta and Y. Suzuki, *Ceramic Bulletin*, vol. 57(6):602-607 (1978).

"A Scale of Activity and Basicity in Glass," The Glass Industry, Kuan-Han Sun, pp. 73-74 (Feb. 1948).

"Mineral Wool," by J.R. Thoenen, *Encyclopedia of Chemical Technology*, Kirk & Othmer, vol. 9:122-132 ( The Interscience Encyclopedia, Inc., New York (copyright 1952).

"Mineral Wool," U.S. Bureau of Mines Information Circular I.C. 6984R, pp. 1-62 (Jun. 1939).

"Slag Wools," *Inorganic Fibres*, pp. 111-127 (undated), no date available.

"Preparation and Properties of Barium Ferrite Using Hot-Rolled Mill Scale," Chien, Yung-Tsen, et al., *J. Am. Ceram. Soc.*, vol. 72(8):1328-1332 (1989).

"The Dissolution of asbestos Fibres in Water," Gronow, J., *Clay Minerals*, vol. 22:21-35 (1987).

"Man-Made Vitreous Fibers: An Overview of Studies on Their Biologic Effects," Gross, P., *Am. Ind. Hyg. assoc. J.*, vol. 47(11):717-723 (Nov. 1986).

"Solubility of Asbestos and Man-Made Fibers In Vito and In Vivo: Its Significance in Lung Disease," Morgan, A., et al., *Environmental Research*, vol. 39:475-484 (1986).

"Corrosion Phenomena in Glass Fibers and Glass Fiber Reinforced Thermosetting Resins," Morgan, A., et al., *Environmental Research*, vol. 23:263-285 (1985).

"Fiber Toxicology," Leineweber, J.P., *J. Occupational Medicine*, vol. 23(6):431-434 (Jun. 1981).

"Development of a Deoiling Process for Recycling Millscale," *Recycling in the Steel Industry, Proceedings of the 1st Process Technology Conference*, vol. 1:184-187, Washington, D.C., (Mar. 25-26, 1980).

"Effects of Glass Surface Area to Solution Volume Ration on Glass Corrosion," Ethridge, E.C. et al., *Physics and Chemistry of Glasses*, vol. 20(2):35-40 (Apr. 1979).

"Glass Compositions for Glass Fibers," Moriya, Ichiro, et al., *Chemical Abstracts*, vol. 89, p. 285, Abstract 89: 184615w (1978).

"Glass for Making Glass Fiber," Grigor'ev, V.S., et al., *Chemical Abstracts*, vol. 81, Abstractr 140076b (1974).

"Dissolution Kinetics of Magnesium Silicates," Luce, R.W., et al., *Geochimica et Cosmochimica Acta.*, vol. 36, pp. 35-50 (1972).

"Solubility of Fibres In Vitro and in Vivo." J.P. Leineweber, Proceedings of 1982 WHO IARC Conference, Copenhagan, vol. 2:87-101 (1988).

"Elements of Ceramics," Norton, F.H., (Addison-Wesley Publishing Co., Inc. Reading, Massachusetts. P. 39 (1952).

Carlock, D.E., "Ceramic Fibres, " *Refractories Journal*, 58:17-20 (1983).

Dietrichs & Kronert, *Gas Warme International*, vol. 30, Issue No. 7/8 (Jul./Aug. 1981).

Ofentechnik Stahl & Eisen, "Furnace technology . . . Heat and Energy." 110(6):115 (Jun. 1990).

Keramishe Zeitschriften, 33(9):516 (1981).

Extract from ENV 1094, Part 7, section 7, 9-12 (1993).

Database WPIL Section Ch. Week 8218, 82-36551E (equivalent to JP-B-57016938 (undatd).

"Multicomponent Silicate Glasses," *Molecular Structure*, pp. 28-31 (undated), no date available.

Thermal Ceramics Product Information for Superwool® Blanket, 2 pages, Mar. 1991.

Thermal Ceramics Brochure entittled "Innovative Solutions for Heat-Intensive Problems,", SF 607™ Blanket, SF 607™ Board, SF 607™ Paper (Apr. 1992), 7 pages.

Carborundum Product Information Brochure for Insulfrax® Blanket, 2 pages (Apr. 1992).

Insulcon Techincal Datasheet entitled "Refactory Fiber Products" (seven pages, Nov. 1992).

Klinger, et al., "Recent developments in high-temperature heat-insulating materials of ceramic fibre," Conference Proceedings from 7$^{th}$ Duisburger Warmedammtagen (Thermal Insulation Conference) Mar. 12, 13, 1997 (pp. 1-13) and its English translation.

Guyadec and Persson, "Inoraginc Binders for High Temperatures Vacuum Forming of Ceramic Fibres," *Universite Joseph Fourier*, Grenoble, France, 1992 Eka Nobel AB (pp. 1-29).

Applications of Nalco® Colloidal Silicas, Nalco Chemical Company, May 1994, one page.

Brochure from Akzo-PQ Silica Amersfoort, Netherlands, 1993 (pp. 4 and 5) and its Emglish translation.

Safety Data Sheet "Carbowool HT Products," Carborubdum Deutschland GmbH, May 28, 1998 (pp. 1-9) and its English translation.

Extrat from two volume Brockhaus ABC Chemie, vol. 1 A-K, p. 672, 1971 relating to term Silica gel, Gelatinous silica and its English translation.

* cited by examiner

BONDED FIBROUS MATERIALS

This invention relates to bonded fibrous materials and is particularly applicable to materials comprising saline soluble fibres bonded with a binder.

Refractory ceramic fibres (RCF) are well known materials and typically comprise an alumino-silicate inorganic fibre formed from an oxide melt which is spun, blown, drawn, or otherwise formed into fibres. Such RCF fibres are used in the manufacture of various industrial and domestic articles. Typical uses of RCF are for applications in which resistance to temperatures in excess of 800° C. is required.

Much RCF fibre is used in the form of needled blankets of fibre in which structural integrity is provided by the fibres that are tangled together in the needling process. (Such products are known as "blanket"). Sometimes a binder is used to lock the fibres together subsequent to exposure to high temperature. Blanket can be processed further to form cut shapes or folded to form insulating modules.

RCF fibre is also used in the production of so-called "Converted Products". Converted products comprise materials in which the RCF is processed further to provide materials in which the RCF is present as either a minor or major constituent. Typical converted products include the following:—

"Board"—substantially rigid flat sheets containing inorganic and/or organic binders produced by a wet process (for example made by dehydrating a suspension of RCF and binders);

"Paper"—a flexible fibrous insulating material with a thickness of less than or equal to 6 mm, formed on paper making machinery (for example RCF in sheet form with a binder);

"Shapes"—substantially rigid shapes made of ceramic fibre with the addition of inorganic and/or organic binder, fired or unfired (for example, RCF formed by vacuum forming into a variety of shapes);

"Fire shapes"—RCF formed by a vacuum forming route and used for domestic and industrial fires either as radiant bodies or for decorative appearance;

"Castables"—ceramic fibre with inorganic and/or organic binder which may be cast (for example, RCF in the form of cements, concretes and mortars);

"Mastics"—A mouldable material containing RCF with binders and which may be trowelled, hand moulded, or dispensed from a pressure gun and which sets upon drying/heating;

"Extrusion"—A mastic-like material that may be used in the manufacture of extruded sections and tubes;

"Textiles"—ceramic fibre which has been woven with or without the addition of other filaments, wires, or yarns (for example, RCF formed into rope, yarn, mats and the like by textile technology).

In many of the above mentioned applications binders are used. There are two broad classes of binders:—

"Organic binders"—which serve to improve the handling characteristics of the product concerned at low temperatures but which burn off at higher temperatures. Organic binders include, for example, such materials as starch.

"Inorganic binders"—which may be effective to improve the handling characteristics of the product concerned at low temperatures, but which also give integrity to the product after exposure to high temperatures. Inorganic binders include, for example, such materials as colloidal silicas, aluminas, and clays.

All of the above materials and concepts are well known in the refractory industry.

Although extremely useful, RCF is an inorganic fibrous material. Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately, for many of the applications for which inorganic fibres are used, there are no realistic substitutes.

Accordingly there is an industry and regulatory demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, these fibres should be safer than fibres that are not so soluble. Accordingly, in recent years, a number of different types of fibre have been proposed which are refractory and yet soluble in body fluids. Such fibres comprise alkaline earth silicates (e.g. WO87/05007, WO89/12032, WO93/15028, WO94/15883, WO96/02478, and WO97/49643) which are soluble to varying extent in body fluids.

A problem with saline soluble fibres is that by their nature they are more reactive than RCF and therefore cannot always be used as a direct replacement for RCF. The applicants have found that one aspect of this reactivity is that the performance of materials at temperatures in excess of 1100° C. is extremely adversely affected by the presence of aluminium in the binders and fillers conventionally used with RCF. The applicants speculate that this adverse effect is due to a eutectic composition that has been reported to lie at about 1238° C. in the $CaO—Al_2O_3—MgO—SiO_2$ phase field.

The applicants have further found that sodium and boron badly affect performance of fibres above 1200° C.

Accordingly the present invention provides a composite material comprising bonded alkaline earth silicate fibres in which any bonding agents or fillers comprise low amounts of aluminium so that the composite material comprises less than 1% aluminium expressed as $Al_2O_3$. Preferably the composite material comprises less than 0.5% by weight of aluminium expressed as $Al_2O_3$. More preferably the composite material comprises less than 0.1% by weight of aluminium expressed as $Al_2O_3$. Yet more preferably the composite material is essentially free of aluminium.

In a further feature the composite material comprises less than 1%, preferably less than 0.5%, more preferably less than 0.1% by weight of sodium expressed as $Na_2O$ and is still more preferably essentially free of sodium.

In a still further feature the composite material comprises less than 0.5% by weight of boron, preferably less than 0.1% of boron expressed as $B_2O_3$.

Further features of the invention are apparent from the claims and the following description, which refers to various applications in which the invention is applicable.

Insulation Board and Shapes.

The invention can be illustrated in its broadest concept by reference to Table 1 which indicate the results of making board using alkaline earth silicate fibres of the SUPER-WOOL™ 612™ composition (available from Thermal Ceramics de France SA or Thermal Ceramics Limited). Such fibres have a nominal composition (by weight) of $SiO_2$ 64%, CaO 17%, MgO 13.5%, $ZrO_2$ 5%, and impurities <0.5%, and are usable at temperatures in excess of 1200° C. and up to 1250° C.

Boards and some shapes are conventionally made by first formulating a suspension of fibre with a cationic organic binder such as a starch and an anionic inorganic binder such as colloidal silica. The cationic organic binder and anionic inorganic binder flocculate, drawing the fibre into a flocculated suspension.

The suspension is placed in contact with mesh moulds and vacuum is applied to the moulds to vacuum form articles either on the outside of the mesh (male mould) or on the inside of the mesh (female mould). Vacuum is applied to the mould until a sufficient thickness of fibre has built up and the mould is then removed from the suspension, the vacuum remaining on for a little while to promote dewatering. This process produces a wet green article containing about 50%–70% water.

At this stage the product is extremely fragile having the consistency of wet cardboard. The wet green article is dried, for example at a temperature of about 150° C. and the organic binder then gives some handling strength. Relatively low amounts of inorganic binder are used in the formation of such materials. A typical recipe for use in vacuum forming would comprise 100 kg of fibre, 25 kg of colloidal silica (a 30% solution i.e. 7.5 kg dry weight), 6.5 kg starch and 1000 gallons (approximately 4500 liters) water. The silica in this formulation amounts to about 0.16% of the suspension formulation and about 7% of the dry materials.

When first fired by the end user of the shape or board the organic binder burns off and the inorganic binder binds the fibres.

Recipes 1, 2 and 3 of Table 1 were tested in the discontinuous manufacture of special shapes. As can be seen Recipe 1 of Table 1 melts at 1250° C. due to the presence of aluminium in the clay. The aluminium reacts with the CaO, MgO, and $SiO_2$ of the fibre to form a eutectic mixture. Although Recipe 1 failed at temperature Recipes 2 and 3 appear to give similar results. Recipes 4 to 10 were tested in the continuous manufacture of board.

Recipe 4 refers to Table 2 to show the effect of aluminium compounds (as aluminium sulphate present in re-cycled wastewater) on high temperature behaviour. This appears to be extremely detrimental.

Recipes 5 and 6 show the effect of adding talc as filler. This appears to improve modulus of rupture and compressive strength. Recipes 5, 7 and 8 allow comparison with other filers, talc giving the best result.

Recipes 5, 9 and 10 allow comparison of the variation of the amount of colloidal silica. Recipe 9 appears the best.

TABLE 1

| Recipe | 1 | 2 | 3 | 4 | 5 | 6 | 7 | 8 | 9 | 10 |
|---|---|---|---|---|---|---|---|---|---|---|
| Fibre | 64.0% | 73.3% | 76.1% | 80.3% | 78.1% | 75.2% | 78.1% | 78.1% | 76.0% | 74.1% |
| Clay | 24% | | | | | | | | | |
| Talc | | | | 14.2% | 15.0% | 14.6% | 17.5% | | 13.2% | 11.8% |
| Wollastonite | | | | | | | | 14.6% | | |
| Fumed Silica | | | | | | | 14.6% | | | |
| Colloidal Silica (30%) | 7.0% | 22.8% | 6.3% | | 3.9% | 3.9% | 3.9% | 3.9% | 7.6% | 11.1% |
| Cationic Starch | 5.0% | 3.9% | 2.8% | | | | | | | |
| Starch | | | | 4.1% | 2.9% | 2.9% | 2.9% | 2.9% | 2.8% | 2.7% |
| Xanthan gum | | | 0.6% | 0.6% | 0.5% | 0.5% | 0.5% | 0.5% | 0.4% | 0.3% |
| Density | 313 | 320 | 277 | 303 | 316 | 320 | 304 | 313 | 307 | 296 |
| Modulus of rupture by bending (MPa) | 1.4 | 0.69 | 1.2 | 0.9 | 0.75 | 0.87 | 0.78 | 0.73 | 1.26 | 1.22 |
| M.O.R. at 1150° C. | | | | 0.04 | | | | | | |
| M.O.R. at 1200° C. | | | | N.A. | 0.2 | 0.24 | 0.16 | 0.11 | 0.77 | 0.68 |
| M.O.R. at 1250° C. | | | | | 0.3 | 0.39 | 0.15 | N.A. | N.A. | N.A. |
| Loss on ignition at 800° C. | 5.2 | 4.5 | 4.2 | 3.6 | 3.6 | 3.6 | 3.4 | 3.4 | 3.4 | 3.6 |
| Linear shrinkage 24 h-1200° C. (%) | | | | see Table | 2.1 | 2 | 2.3 | 1.9 | 2.6 | 2.6 |
| Linear shrinkage 24 h-1250° C. (%) | melted | 2.1 | 1.2 | 2 | 2.1 | 2.2 | 2.5 | N.A. | N.A. | N.A. |
| Compressive strength @ 10% (MPa) | | | | 0.22 | 0.13 | 0.15 | 0.13 | 0.12 | 0.22 | 0.24 |
| Compressive Strength at 1150° C. for 10% (MPa) | | | | 0.1 | | | | | | |
| Compressive Strength at 1200° C. for 10% (MPa) | | | | N.A. | 0.07 | 0.09 | 0.05 | 0.03 | 0.20 | 0.19 |

TABLE 2

| $Al_2O_3$ content (wt %) | 10.2 | 6.7 | 6.3 | 5.1 | 0.4 |
|---|---|---|---|---|---|
| Shrinkage at | melted | 1.8 | 1.7 | 1.6 | |

TABLE 2-continued

| 1150° C. - 24 hours Shrinkage at 1200° C. - 24 hours | | melted | glazed | glazed | glazed | 2.3 |
|---|---|---|---|---|---|---|

The recipes of Table 1 resulted in boards having the composition set out in Table 3.

TABLE 3

| Recipe | 1 | 2 | 3 | 4 | 5 | 6 | 7 | 8 | 9 | 10 |
|---|---|---|---|---|---|---|---|---|---|---|
| Fibre | 67.3% | 87.2% | 79.7% | 80.3% | 80.3% | 77.3% | 80.3% | 80.3% | 80.3% | 80.3% |
| Clay | 25.2% | | | | | | | | | |
| Talc | | | 14.8% | 15.0% | 15.0% | 18.0% | | | 13.9% | 12.8% |
| Wollastonite | | | | | | | | 15.0% | | |
| Fumed Silica | | | | | | | 15.0% | | | |
| Colloidal silica (30%) | 2.2% | 8.2% | 2.0% | | 1.2% | 1.2% | 1.2% | 1.2% | 2.4% | 3.6% |
| Cationic Starch | 5.3% | 4.6% | 2.9% | | | | | | | |
| Starch | | | | 4.1% | 3.0% | 3.0% | 3.0% | 3.0% | 3.0% | 3.0% |
| Xanthan gum | | | 0.6% | 0.6% | 0.5% | 0.5% | 0.5% | 0.5% | 0.4% | 0.3% |

A typical and useful range of ingredients for making insulating board and shapes by vacuum forming is (in weight percent):—
Alkaline earth metal silicate fibre 70–85%
Colloidal silica (30% SiO$_2$ by weight) 3–25%
Organic binder 1–6%
Filler 11–20% and from such ingredients typical and useful compositions in the finished board are:—
Alkaline earth metal silicate fibre 70–90%
Colloidal silica (30% SiO$_2$ by weight) 1–10%
Organic binder 1–6%
Filler 11–20%

The examples given above have compositions in the range:—
Alkaline earth metal silicate fibre 77.3–87.2%
Colloidal silica (30% SiO$_2$ by weight) 1.2–8.2%
Organic binder 3.3–4.7%
Filler 12.8–18%

In all of the above tested compositions the colloidal silica used was Nyacol™ 1430 which has a sodium content of about 0.4% by weight. The amount of colloidal silica binder present was sufficiently low (3.9–22.8% by weight of the colloidal silica translating as approximately 1.2–7 wt % silica binder in the finished product) that the sodium in the binder did not have an appreciable deleterious effect on the properties of the material.

Papers

The same principles apply in the manufacture of papers. In the conventional manufacture of refractory paper slurry is made in like manner to vacuum forming and is cast upon a wire former as in paper making machinery.

The normal flocculant used is alum. The applicants have been able to make refractory fibre paper using acrylic latex binders and an organic flocculant. Such papers have been tested to 1250° C. and while collapsing at 1200° C. the fibres remain in place providing some insulating effect. In contrast, if alum is used as a flocculating agent the paper melts.

A typical recipe (by weight percent) for the paper is:—
SUPERWOOL™ 612™ 90–95%
Acrylic latex (PRIMAL HA8™ from Rohm & Haas) 5–10%
Organic flocculants <1%

Suitable organic flocculants comprise the PERCOL L Series™ from Allied Colloids. These are polyacrylamide based products. In particular PERCOL 230L works well.

Fire Beds, Artificial Coals, and Fire Shapes.

Articles that are directly exposed to flames are in an aggressive environment with temperatures in excess of 1000° C. and exposure to combustion products. Use of conventional binders with alkaline earth metal silicate fibres (SUPERWOOL™ 612™) led to cracking of shapes. The applicants tested a series of compositions by making pieces using different colloidal silica binders each present at the same amount (about 6% by weight). These pieces were heated to 1000° C. for one hour and assessed for cracking, friability, and hardness (Shore 'o'). The results of these tests are given in Table 4 below:—

TABLE 4

| Colloid | pH | Na$_2$O (wt %) | Specific Surface Area (m$^2$/g) | Silica (wt %) | Cracking | Friability | Hardness |
|---|---|---|---|---|---|---|---|
| Nyacol™ 1430 | 10.2 | 0.4 | 230 | 30 | Bad fracturing | Friable | 10–17 |
| Syton™ X30 | 9.9 | 0.3 | 250 | 30 | Some fracture | Fibrous | 57 |
| Levasil™ 200-A-30 | 9.5 | 0.17 | 200 | 30 | Minor fracture | Friable | 40 |
| Bindzil™ 40/220 | 9.7 | 0.42 | 220 | 40 | Some fracture | Friable | 40 |
| Bindzil™ 30NH$_3$/220 | 9.5 | <0.1 | 220 | 30 | Some fracture | Fibrous | 47 |

From this it was deduced that:— a) Alkaline pHs were associated with fractured pieces and could be indicative of poor thermal shock resistance; and
b) A reduction in $Na_2O$ content appears to correlate with friability of the product.

Accordingly, and in view of the growing perception that aluminium, sodium and boron are detrimental to the high temperature performances of alkaline earth metal silicate fibres, the applicants requested their suppliers of colloid (Univar of Croydon, England—distributors for Akzo Nobel) to supply colloidal silica meeting the following requirements not usually called for commercially:— a) The colloidal silica should have a slightly acid to roughly neutral pH, preferably in the range 6.5 to 7.5
b) The soda content of the colloidal silica should be low, preferably below 0.1 wt %
c) The silica should not have appreciable amounts of aluminium present.

A preliminary experimental product supplied under the reference Bindzil 30/220LPN comprised 30 wt % silica, had a pH of 7.0 and comprised 0.08 wt % $Na_2O$. The same trial as above was repeated using this silica and a product was produced which did not crack and remained fibrous with a Shore 'o' hardness of 50. Further samples were made and subjected to a 250 hours cycling test (2 hours on and 2 hours off under gas flame) and passed this test.

Preliminary specifications for the typical colloidal silicas usable to achieve these results are:—

TABLE 5

| | | |
|---|---|---|
| $SiO_2$ content (by weight) | 30 | 25 |
| Viscosity | <10 cP | <10 cP |
| pH | 6.5–8.0 | 6.5–8.0 |
| Specific Surface Area ($m^2/g$) | 220–240 | 220–240 |
| Density ($g/cm^3$) | 1.192–1.199 | 1.155–1.175 |
| $Na_2O$ content (by weight) | <0.1 | <0.1 |

Such silicas are obtainable from Akzo Nobel under the reference Bindzil 30/220LPN or the mark THERMSOL™.

A typical mixture for use in the manufacture of fire shapes comprises:—

TABLE 6

| | |
|---|---|
| Fibre (e.g. SUPER WOOL 612 ™) | 60 parts by weight |
| Colloidal silica (e.g. THERMSOL ™ = Bindzil 30/220 LPN [30% by weight $SiO_2$]) | 12–14 parts by weight |
| Starch (e.g. PLV available from Avebe, Netherlands) | 2.5 parts by weight |

The amount of water used in forming the slurry varies according to application but may for example range from 2700–4500 liters (600–1000 gallons). The fibre typically represents about 0.5–4% by weight of fibre in water. Not all of the ingredients will be incorporated into a vacuum formed product formed from this mixture but typically such a mixture leads to a product comprising approximately 6% by weight colloidal silica, 3.5–5% starch with the balance fibre. The tolerable range for colloidal silica is usually from about 4% to about 9% by weight in the finished product.

Alternative compositions excluding organic binders (useful for such high temperature applications as cooker rings) may be made for example from slurry compositions 1 and 2 below:—

TABLE 7

| Component | COMPOSITION 1 | COMPOSITION 2 |
|---|---|---|
| "White water" component | 50–80% by volume of 30% solids THERMSOL ™ = Bindzil 30/220 LPN with 20–50% by volume mains water | 90–100% by volume of 30% solids THERMSOL ™ = Bindzil 30/220 LPN with 10–0% by volume mains water |
| Fibre (SUPERWOOL™ 612) | 0.5–4% by weight of solids to white water component | 2–3% by weight of solids to white water component |

"White water" is the industry term for a mixture of water and colloidal silica. Such slurry compositions lead to products comprising 15–30% by weight silica with the balance fibre.

Typical ring slurry compositions are, in parts by weight:—

Ring Slurry Composition 1
THERMSOL colloidal silica 355
Fibre (SUPERWOOL™ 612) 3–5
Fresh water 95

Ring Slurry Composition 2
LEVASIL 200-A-40 colloidal silica 750
Fibre (spun and chopped SUPERWOOL™ 612) 30
Fresh water 250

LEVASIL 200-A-40 differs from LEVASIL 200-A-30, mentioned in Table 4 above, in that in proportion to the amount of silica present LEVASIL 200-A-40 has a lower amount of sodium. Additionally, and very importantly, LEVASIL 200-A-30 is aluminate modified whereas LEVASIL 200-A-40 avoids alumina. LEVASIL 200-A-40 has the characteristics:—
Silica content (wt %) 40–41.5
$Na_2O$ content (wt %) 0.16–0.24
Specific Surface Area ($m^2/g$) 180–220
pH 8.5–9.5.

The applicants find no deleterious effects in cooker ring production or performance in using LEVASIL 200-A-40. Suitable slurry compositions for rings using a 40% colloidal silica are:—

TABLE 8

| Component | |
|---|---|
| "White water" component | 65–100% by volume of 40% solids low sodium content colloidal silica having a pH of less than 10 with 35%–0% by volume mains water |
| Alkaline earth metal silicate fibres, for example chopped spun fibre | 2–3 wt % by weight of solids to white water component |

The materials described above under the heading "fire beds, artificial coals, and fire shapes" (see Table 6) can also be used in wider applications such as boards and shapes.

A typical composition for forming boards and shapes is, in parts by weight:—
Starch (Solvitose PLV) 4.8
THERMSOL colloidal silica 32
Fibre (SUPERWOOL™ 612) 80

Generally, the fibre content should preferably be between 0.5 and 5% of the weight of the water. Selection of particular compositions for the wide variety of applications that such bonded fibrous materials are used in is a matter of experiment.

From the above results it can be seen that where the amount of binder used is high the amount of sodium in the binder is best kept low. Similar considerations apply for boron. It should be noted that some colloidal silicas contain aluminium as a counter-ion and such colloidal silicas should be avoided.

What is claimed is:

1. A composite material comprising colloidal silica-bonded alkaline earth silicate fibers in which any bonding agents or fillers comprise low amounts of alumina so that the composite material comprises less than 1% by weight aluminium expressed as $Al_2O_3$.

2. A composite material as claimed in claim 1 in which the composite material comprises less than 0.5% by weight of aluminium expressed as $Al_2O_3$.

3. A composite material as claimed in claim 2 in which the composite material comprises less than 0.1% by weight of aluminium expressed as $Al_2O_3$.

4. A composite material as claimed in claim 1 in which the composite material is essentially free of aluminium.

5. A composite material as claimed in claim 1 and comprising less than 1% by weight sodium expressed as $Na_2O$.

6. A composite material as claimed in claim 5 and comprising less than 0.5% by weight sodium expressed as $Na_2O$.

7. A composite material as claimed in claim 6 and comprising less than 0.1% by weight sodium expressed as $Na_2O$.

8. A composite material as claimed in claim 1 in which the composite material is essentially free of sodium.

9. A composite material as claimed in claim 1 and comprising less than 0.5% by weight boron expressed as $B_2O_3$.

10. A composite material as claimed in claim 9 and comprising less than 0.1% by weight boron expressed as $B_2O_3$.

11. A composite material as claimed in claim 1 in which the alkaline earth silicate fibre is itself adapted for use without excessive shrinkage at temperatures in excess of 1200° C.

12. A composite material as claimed in claim 1 in which the material is obtainable by vacuum forming from a slurry containing the following ingredients in weight %:—
  Alkaline earth metal silicate fibres 70–85%
  Colloidal silica (30% $SiO_2$ by weight) 3–25%
  Organic binder 1–6%
  Filler 11–20%.

13. A composite material as claimed in claim 1 comprising:—
  Alkaline earth metal silicate fibres 70–90%
  Silica binder from colloidal silica (30% $SiO_2$ by weight) 1–10%
  Organic binder 1–6%
  Filler 11–20%.

14. A composite material as claimed in claim 13 comprising:—
  Alkaline earth metal silicate fibres 77.3–87.2%
  Silica binder from colloidal silica (30% $SiO_2$ by weight) 1.2–8.2%
  Organic binder 3.3–4.7%
  Filler 12.8–18%.

15. A composite material as claimed in claim 1 in which the material is a paper comprising:—
  Alkaline earth metal silicate fibre 90–95%
  Organic binder 5–10%
  Organic flocculants <1%.

16. A composite material as claimed in claim 15 in which the organic binder is an acrylic latex.

17. A composite material as claimed in claim 1 in which the material is a material obtained by vacuum forming from a slurry comprising the ingredients:
  Alkaline earth metal silicate fibre 60 parts by weight
  Colloidal silica (30% by weight $SiO_2$) 12–14 parts by weight
  Starch 2.5 parts by weight
based upon the total weight of solids added to the slurry; and in which the colloidal silica has a pH of less than 8.

18. A composite material comprising 4–12% by weight colloidal silica, 3–6.5% starch, balance alkaline earth silicate fibre, to total 100% based on the weight of composite material.

19. A composite material as claimed in claim 18 and comprising 4–9% by weight colloidal silica, 3.5–5% starch, balance alkaline earth silicate fibre, to total 100% based on the weight of composite material.

20. A composite material as claimed in claim 18 comprising about 6% colloidal silica.

21. A composite material as claimed in claim 1 in which the material is a material obtainable by vacuum forming from the ingredients:—
  White water component 50–80% by volume of 30% solids colloidal silica with 20–50% by volume water
  Alkaline earth metal silicate fibre 0.5–4% by weight of fibre, calculated as the weight of the fibre solids per weight of white water component
and in which the colloidal silica has a pH of less than 8.

22. A composite material as claimed in claim 1 in which the material is a material obtainable by vacuum forming from the ingredients:—
  White water component 90–100% by volume of 30% solids colloidal silica with 10–0% by volume water
  Alkaline earth metal silicate fibre 2–3% by weight of fibre, calculated as the weight of the fibre solids per weight of white water component
and in which the colloidal silica has a pH of less than 8.

23. A composite material as claimed in claim 21 and which comprises 15–30% by weight silica binder formed from colloidal silica, balance fibre.

24. A composite material as claimed in claim 17 in which the fibre is present in amounts comprising 0.5–5% by weight of the water in the slurry.

25. A composite material as claimed in claim 1 in which the material is a material obtainable by vacuum forming from the ingredients
  White water component 65–100% by volume of 40% solids colloidal silica having a pH of less than 10 with 35–0% by volume water
  Alkaline earth metal silicate fibre 2–3% by weight of fibre, calculated as weight of fibre solids per weight of white water component
wherein the sodium content of the colloidal silica is below 0.1 wt %.

26. A composite material as claimed in claim 22 and which comprises 15–30% by weight colloidal silica, balance fibre.

* * * * *